Jan. 7, 1936. R. WIDERÖE 2,027,214
ELECTRORESPONSIVE APPARATUS
Filed Nov. 14, 1931 3 Sheets-Sheet 1

Inventor:
Rolf Wideroe,
by Charles N. Mullan
His Attorney.

Jan. 7, 1936. R. WIDERÖE 2,027,214
ELECTRORESPONSIVE APPARATUS
Filed Nov. 14, 1931 3 Sheets-Sheet 2
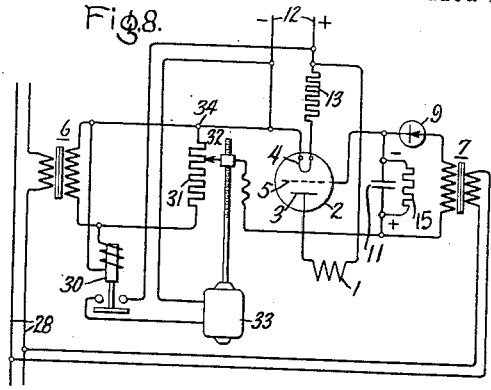
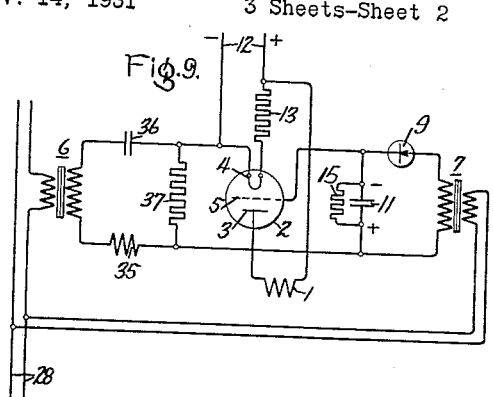
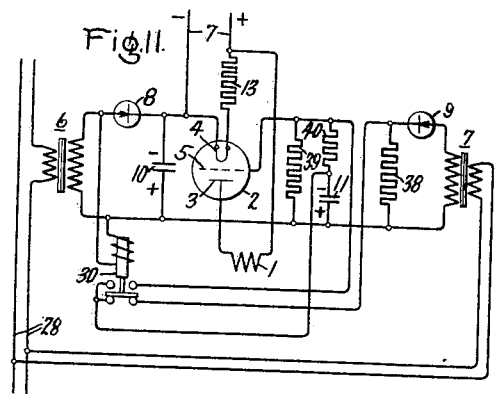
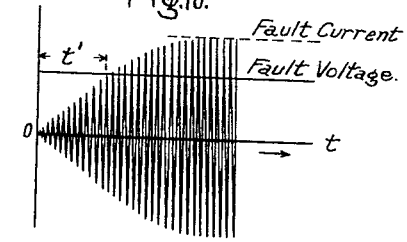
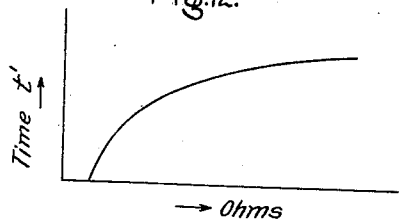
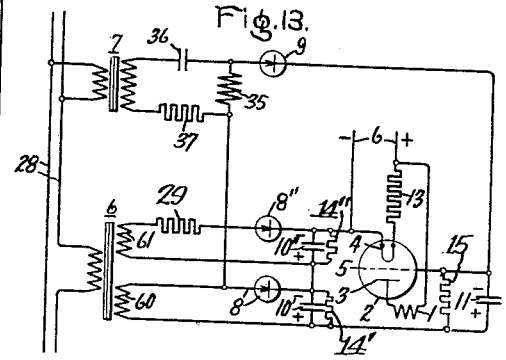
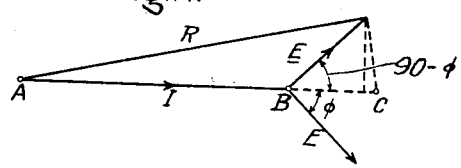
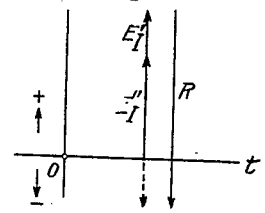
Inventor:
Rolf Wideroe,
by Charles E. Tullo
His Attorney.

Jan. 7, 1936.                R. WIDERÖE                2,027,214
                       ELECTRORESPONSIVE APPARATUS
                         Filed Nov. 14, 1931        3 Sheets-Sheet 3
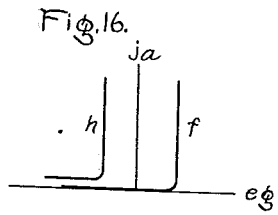
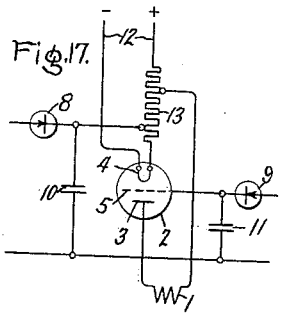
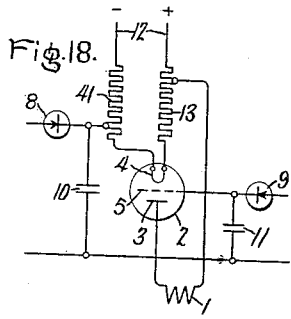
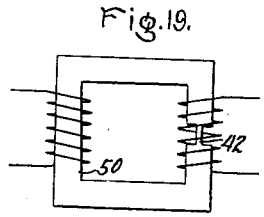
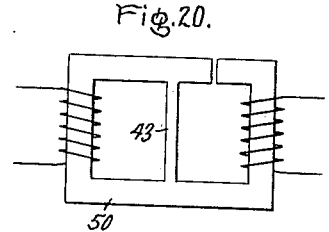
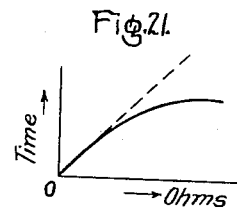
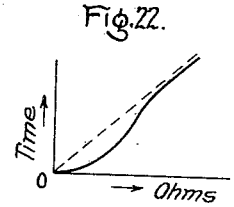
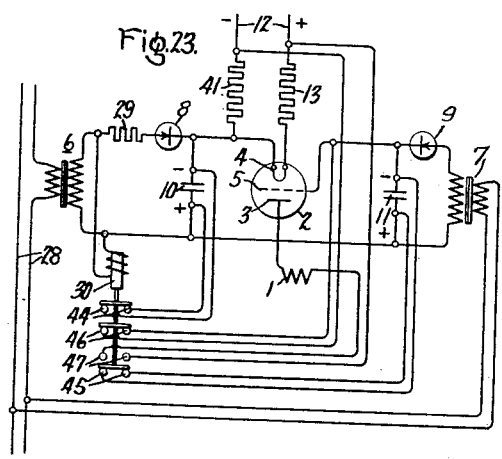
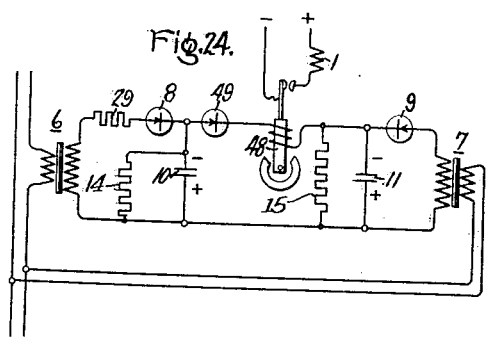
Inventor:
Rolf Wideröe,
by Charles E. Tullar
  His Attorney.

Patented Jan. 7, 1936

2,027,214

UNITED STATES PATENT OFFICE 2,027,214

ELECTRORESPONSIVE APPARATUS

Rolf Wideröe, Berlin-Karlshorst, Germany, assignor to General Electric Company, a corporation of New York Application November 14, 1931, Serial No. 575,139
In Germany November 22, 1931

7 Claims. (Cl. 175—294)

My invention relates to improvements in electroresponsive apparatus and more particularly fault responsive apparatus for the protection of electric circuits. An object of my invention is to provide improved electroresponsive apparatus which operates differentially and very sensitively in response to electrical alternating current magnitudes without the necessity for mechanical restraining devices.

Such devices are difficult accurately to adjust and maintain adjusted and require material changes for different settings in the apparatus. In accordance with my invention, the disadvantages of mechanical devices and especially restraining devices are eliminated by connecting in opposition to an electric alternating current magnitude to be controlled a rectified alternating current voltage or a direct current voltage in such a way that the difference between them is effective in a circuit, controlling the energization of a device to be operated. Consequently, the device to be operated needs only to be proportioned for the amount of the difference between electrical magnitudes without regard to their absolute value. Moreover, by employing the electrical magnitudes directly instead of forces produced by the magnitudes, it is possible in accordance with my invention to obtain a much higher degree of sensitivity.

My invention will be better understood from the following description when considered in connection with the accompanying three sheets of drawings and its scope will be pointed out in the appended claims.

Figure 1:
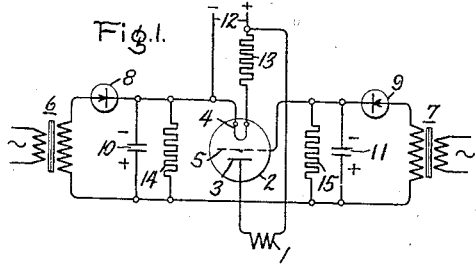
Figure 2:
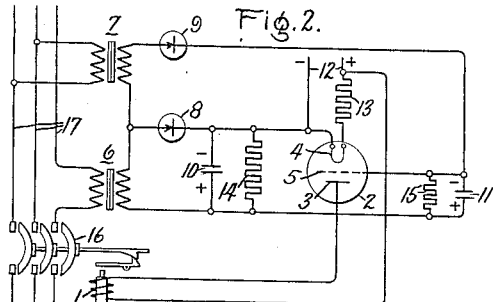
Figure 3:
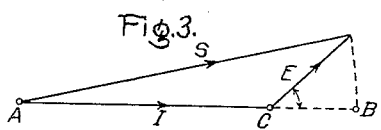
Figure 4:
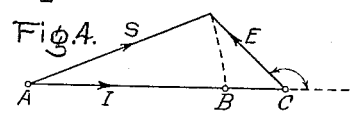
Figure 5:
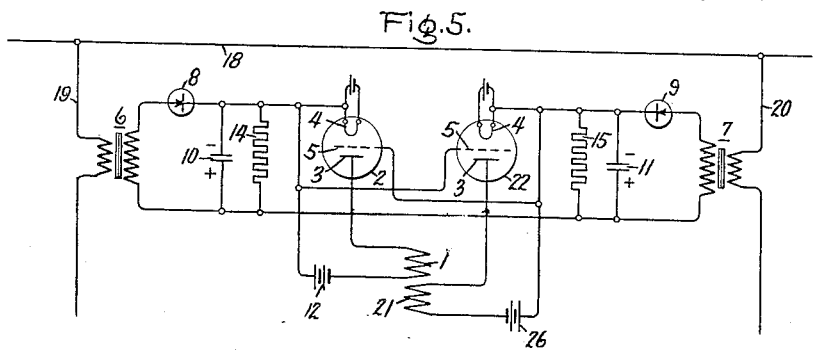
Figure 6:
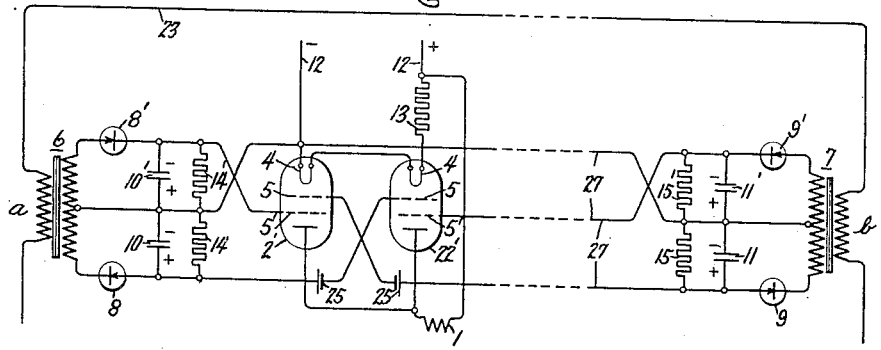
Figure 7:
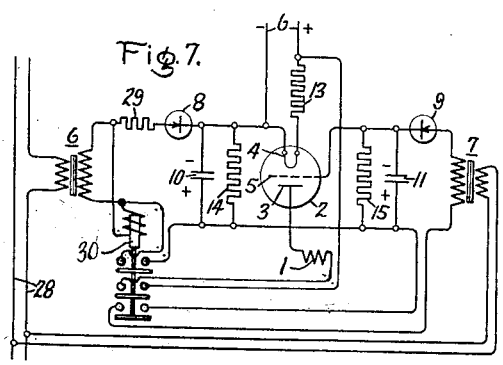

In the accompanying drawings, Fig. 1 illustrates diagrammatically electro-responsive apparatus embodying my invention; Fig. 2 illustrates diagrammatically power directional responsive apparatus embodying my invention; Figs. 3 and 4 are vector diagrams explanatory of the embodiment of my invention shown in Fig. 2; Figs. 5 and 6 illustrate current differential responsive apparatus embodying my invention; Figs. 7, 8, and 9 illustrate diagrammatically embodiments of my invention in apparatus functioning in accordance with the relative magnitudes of a current and a voltage of an alternating current circuit; Fig. 10 is a curve diagram and wave form explanatory of the embodiment of my invention shown in Fig. 9; Fig. 11 illustrates diagrammatically another embodiment of my invention in apparatus functioning in accordance with the relative magnitudes of a current and a voltage of an alternating current circuit; Fig. 12 is a curve diagram explanatory of the embodiment of my invention shown in Fig. 11; Fig. 13 illustrates diagrammatically an embodiment of my invention in apparatus functioning in accordance with the relative magnitudes of a current and a voltage of an alternating current circuit; Figs. 14 and 15 are vector diagrams explanatory of the embodiment of my invention shown in Fig. 13; Fig. 16 is a curve diagram explanatory of my invention; Figs. 17 and 18 represent details in connections adapted for use in carrying out my invention; Figs. 19 and 20 illustrate transformers suitable for carrying out certain modifications of my invention; Figs. 21 and 22 illustrate operating characteristics of certain embodiments of my invention when employing the transformers illustrated in Figs. 19 and 20 respectively; and Figs. 23 and 24 illustrate diagrammatically other embodiments of my invention in apparatus functioning in accordance with two electrical alternating current magnitudes.

In the embodiment of my invention shown in Fig. 1, a device 1 is to be operated in accordance with the relative values of two alternating current magnitudes. The device 1 is connected in the anode circuit of an electric discharge valve 2 having an anode 3, a cathode 4 and a control electrode means 5 so as to be differentially operated in dependence on two alternating current magnitudes derived from transformers 6 and 7. The magnitudes to be compared may be for example two currents, two voltages, a current and a voltage, or functions of one or more of each combined according to the purpose desired. If the transformers 6 and 7 are current transformers, they may have an air gap so as to eliminate the necessity of connecting load resistances across their secondaries. The secondaries of the transformers are connected through suitable rectifying means 8 and 9 to condensers 10 and 11, respectively. These are accordingly charged by direct voltages proportional to the transformer outputs to be compared. The voltages across the condensers 10 and 11 are applied to the valve 2 so that their difference is effective to control the anode current and therefore the operation of the device 1. For this purpose these voltages may be applied differentially to the control electrode means or grid 5, as shown. It will be obvious to those skilled in the art that, depending on the characteristics of the valve employed, a grid biasing source may or may not be necessary. An anode current source 12 may be also used to supply the cathode 4 of the valve through a resistance 13. Grid leak resistances 14 and 15 may be employed so that the condenser voltages quickly follow the changes in the outputs of the transformers 6 and 7. It will be apparent that whenever the difference between the outputs of the transformers 6 and 7 exceeds a certain value the grid 5 will become positive and the valve 2 conductive whereby to energize the device 1 which may be a relay, a circuit breaker trip coil, etc.

If the transformers 6 and 7 are, for example, current transformers connected in a section of an electric system, then the device 1 would respond to the difference between the currents flowing into and out of the section whereby to determine the occurrence of internal faults in consequence of the current unbalance they produce.

It will be apparent to those skilled in the art that where each of two parallel feeders is supplied with a choke coil, the transformers 6 and 7 may be voltage transformers connected in the feeders on the load side of the choke coils whereby to obtain operation on the voltage difference caused by a drop in voltage on one feeder due to a fault thereon.

The arrangement shown in Fig. 1 can likewise be employed for determining the load asymmetry of a polyphase circuit. For this purpose voltages dependent on the vector sum of the load currents may be resolved into their positive and negative phase sequence components by means of static or dynamic segregating devices, examples of which are well known to the art. By applying these positive and negative phase sequence voltages to the transformers 6 and 7 a differential operation is attained based on the relative values of these voltages.

If one of the transformers 6 and 7 is connected to be energized in accordance with the current of an alternating current line and the other in accordance with the voltage of the line, the operation of the device 1 is dependent on the relative values of the current and voltage with a distance action dependent on the line impedance. Thus, if the transformer 6 is a current transformer, the voltage $E_I$ on condenser 10 is proportional to the line current I and if the transformer 7 is a potential transformer, its secondary voltage $E_E$ on the condenser 11 is proportional to the line voltage E. If the characteristic of the valve 2 is such that it becomes conductive when the grid voltage is zero, the device 1 is operated when $$E_I - E_E = 0 \text{ or } cI - c'E = 0$$

$$\frac{c}{c'} = \frac{E}{I}$$

where $c$ and $c'$ are two constants dependent on the transformation ratios of the auxiliary transformers 6 and 7. The device 1, therefore, operates when the impedance falls below a certain predetermined amount which is dependent on the transformation ratios of the transformers 6 and 7.

In the embodiment of my invention illustrated in Fig. 2 the device 1, shown as a trip coil for controlling the circuit breaker 16 in a three-phase circuit 17, is arranged to be operated responsively to the direction of power in the circuit by algebraical difference operation in accordance with a function of the current and the voltage opposed by the current. One of the transformers 6 is a current transformer connected to be energized in accordance with the current in a conductor of the circuit 17 while the other transformer 7 is a potential transformer connected to be energized in accordance with the phase voltage between the two conductors. The secondary voltages of the transformers 6 and 7 are connected in series and applied to the condenser 11 through the rectifier 9 so as to charge the condenser with a direct voltage proportional to the vector sum of the secondary voltages. The secondary voltage of the transformer 6 is also applied to the grid circuit 5 of the valve 2 in opposition to the voltage across the condenser 11 through the rectifier 8 and condenser 10, thus applying to the grid a voltage proportional to a current in the circuit to be protected.

The operation of the arrangement shown in Fig. 2 will be explained by reference to Figs. 3 and 4. The auxiliary voltages occurring across the secondary windings of the transformers 6 and 7 are designated by I and E. With power flow in the normal direction, the angle between the vectors I and E is less than 90°. The vector sum S of these voltages is rectified in the rectifier 9 and charges the condenser 11, the charge being proportional to the distance S or AB. The voltage across the condenser 10 corresponding to the distance AC is connected in opposition to the voltage across the condenser 11. Consequently the resulting voltage on the grid 5 is proportional to the distance CB which has the same polarity as the charge on the condenser 11 and represents a negative grid voltage. The valve 2 is accordingly rendered non-conductive. If the direction of power flow is reversed, the angle between the vectors I and E is greater than 90°, as shown in Fig. 4. Consequently, there is imposed on the grid 5 of the valve 2 the negative voltage of the condenser 11 and in series therewith the positive voltage of the condenser 10. The difference CB between these voltages is positive. Consequently, the valve is rendered conductive and the trip coil 1 thereby energized.

In the embodiment of my invention illustrated in Fig. 5, I have shown an arrangement which is selectively operable in accordance with the relative magnitudes of the current at each of two points of an alternating current electric system. As illustrated, the system includes a bus 18 arranged to supply two parallel feeders 19, 20 through suitable circuit interrupting means, examples of which are well known to the art, and which are omitted for the sake of simplicity. To obtain the desired selective operation, the arrangement is such as to operate one device when the current in the feeder 19 is greater than the current in the feeder 20 and another device when the current in the feeder 20 is greater than the current in the feeder 19. For such operation I provide two electric discharge valves 2 and 22. The transformers 6 and 7 are in this case current transformers respectively connected to be energized in accordance with the currents in corresponding phase conductors of the feeders 19 and 20. These transformers are connected to the rectifier circuits and the valves in the same manner as illustrated in Fig. 1. The rectifier 8 is however connected to the cathode 4 of the valve 2 and also to the grid 5 of the valve 22 while the rectifier 9 is connected in the reverse order to the cathode 4 of the valve 22 and the grid 5 of the valve 2. As shown, the anode circuits of the valves 2 and 22 are separate from each other and include the windings 1 and 21 respectively of devices to be operated in response to the difference between the currents in the feeders 19 and 20. Accordingly, for this arrangement two separate anode current sources 12 and 26 are provided. It will now be apparent that accordingly as to whether the current in feeder 19 or feeder 20 preponderates, one or the other of the valves 2 or 22 respectively which receives the positive grid voltage will become conductive selectively to control the energization of the devices 1 and 21.

The arrangement shown in this figure can be employed for all cases in which the question of a comparison of electric magnitudes, and in connection with which both the positive and also the negative difference of the magnitudes to be controlled, is intended to control the operation as, for example, in connection with the differential protection of a single conductor which may be fed from both ends.

The arrangement shown in Fig. 6 is also for accomplishing a selective operation in accordance with the relative magnitudes of two alternating current quantities as is the purpose of the arrangement shown in Fig. 5. In the embodiment shown in Fig. 6, double grid valves 2' and 22' and different transformers are employed. Also with the arrangement shown in Fig. 6 one of the anode sources may be omitted. The transformers 6 and 7 may be current transformers connected in series relation with a line conductor 23 at points $a$ and $b$ and are provided with divided or tapped secondary windings, as shown. To these secondary windings are connected, through the rectifiers 8, 8', the condensers 10, 10', and through the rectifiers 9, 9', the condensers 11, 11'. The connections of the rectifiers are such that direct voltages occur across the condensers having the signs shown in the figure. The grids 5, 5' of the discharge valves 2' and 22' are connected to both transformers 6 and 7. To the grid 5' of the valve 2' there is applied a negative voltage from the condenser 10', this voltage being proportional to the current in the line where the transformer 6 is connected. On the other grid 5 of the valve 2' there is applied a positive voltage from the condenser 11, this voltage being proportional to the current in the line 23 where the transformer 7 is located. If the voltage across the condenser 11 is greater than that across the condenser 10', a positive grid potential occurs on the control electrode means in the valve 2' and the valve is rendered conductive whereby to energize the device 1. The valve 2', therefore, operates if the current in the line 23 where the transformer 7 is located is greater than the current in the line 23 where the transformer 6 is located. In the opposite case, the valve 22' operates, this valve having differentially applied to its control electrode means the voltage across condensers 10 and 11'.

It will be apparent that with the arrangement shown in Fig. 6, it is possible to have the device 1 energized when instead of the fault current difference, that is $I_a - I_b$, as in Fig. 6, the ratio of fault current, that is the difference between the currents at the points $a$ and $b$, to load current, that is the sum of the currents at the points $a$ and $b$, $$\frac{I_a - I_b}{I_a + I_b}$$

exceeds a certain fixed value. Devices thus arranged have a greater sensitivity than do those in which only the difference $I_a - I_b$ is the controlling factor of the operation. The dependence on the ratio of fault current to load current can only be obtained with non-differential protective devices by the aid of special restraining means which bring about an undesirable complication of the device. With the differential protective arrangement, according to my invention, on the other hand, the desired dependence can be obtained merely by a special subdivision of the transformers 6 and 7, as will be apparent from the following calculation. Let the ratio of fault current to load current, at which the release is to take place, be $m$, that is $$\frac{I_a - I_b}{I_a + I_b} = m$$

from this it follows that $$I_a - I_b = m(I_a + I_b) \text{ or } I_a(1-m) = I_b(1+m)$$

The condition for operation then becomes $$I_a(1-m) - I_b(1+m) = 0$$

and that for a current difference of the opposite sign $$I_b(1-m) - I_a(1+m) = 0$$

From the last two equations it is quite clear that the desired ratio dependence can be obtained without difficulty. To this end it is only necessary, for example, that the secondary windings of the transformers 6 and 7 be subdivided in such a way that the voltages occurring across the condensers 10, 10' and 11, 11' respectively are proportional to $K(1-m)$ and $K(1+m)$, with respect to the corresponding primary currents, K being a constant dependent on the transformation ratio of the transformers.

In order to avoid operation of the device 1 with circuit currents approximately zero, there may be applied to the grids 5 of the valves 2', 22' negative grid biasing voltages from suitable sources 25.

For the differential protection of cables, the novel protective arrangements embodying my invention possess, in addition to the advantages previously set forth and apart from the much desired reduction of current transformer load, the further additional advantage that by the use of trap or filter circuits the arrangements can be easily protected against disturbing voltages induced by the conductor to be protected, these voltages being of the line frequency or a harmonic thereof. This is of particular importance with the longitudinal differential protection of cables in which the auxiliary or pilot wires run parallel with the cable for long distances since in most cases in which the protective devices have to operate extremely large currents and correspondingly great disturbing conditions are present.

In all the arrangements described, with the exception of that shown in Fig. 6, the rectification of one of the magnitudes to be compared can be eliminated and instead of this an alternating voltage can be fed to the valve 2. The voltage on the grid and of negative sign, that is the biasing voltage must be, however, always a direct voltage. With the differential protective arrangement shown in Fig. 6, the transmission over the pilot wires 27 should be with direct current. Consequently, in this case the positive voltage on the grids must be a direct current voltage.

My invention is particularly suited for protective apparatus in which operation is to occur not only in dependence on the system magnitudes to be controlled but also on the time. Thus, in Fig. 7 I have illustrated the application of my invention to distance protective apparatus whose time of operation is dependent on the distance between the apparatus and the fault. The connections are analogous to those of Fig. 1. The transformer 6 is a current transformer connected to be energized in accordance with the current in a circuit 28 to be controlled. In circuit with the secondary is the rectifier 8 and the condenser 10. The secondary circuit also includes a resistance 29 to influence the rise of voltage in the condenser 10 whereby to obtain a time delay. The voltage across the condenser 10 rises from the moment the voltage is connected to the condenser in accordance with the expression $$E_I = cI(1 - e^{-\frac{t}{T}})$$

$E_I$ being the voltage across the condenser, $I$ the current in the circuit, $c$ a constant, $e$ the base of the system of natural logarithms, $t$ the time to build up the charge, and $T$ the time constant of the circuit including the secondary of the transformer 6, the resistance 29, the rectifier 8 and the condenser 10. The initial part of this curve can be considered with fairly close approximation to be a straight line and in this respect is represented by the equation $$E_I = aIt$$

in which $a$ indicates a further quantity dependent on the current circuit constant. The transformer 7 is a potential transformer connected to be energized in accordance with the voltage of the circuit 28 and includes in its secondary circuit the rectifier 9 and the condenser 11. A voltage proportional to the circuit voltage is accordingly impressed on the condenser 11. Consequently, on the grid of the discharge valve 2 there is impressed the difference between the direct current voltages across the condensers 10 and 11. In order to have the device 1 operative on the occurrence of a fault, the secondaries of the transformers 6 and 7 may be connected to supply the valve 2 by any suitable means responsive to the fault condition. The particular means illustrated is an overcurrent relay 30 which is arranged to complete the charging circuits of the condensers and the anode circuit of the valve 2 in response to predetermined overcurrent conditions of the circuit 28 although it will be obvious to those skilled in the art that any other suitable electroresponsive device could be used.

It will be apparent that the voltage across the condenser 11 quickly adjusts itself to an amount proportional to the voltage of the circuit 28 to be protected. The voltage across the condenser 10, is, on the other hand, zero at the moment when the relay 30 closes its contacts and rises gradually proportionally to the time. This voltage is applied to the grid 5 of the valve 2 in opposition to the voltage across the condenser 11 and until both voltages are in equilibrium, the voltage on the grid is negative. As soon as the grid voltage becomes zero, the valve becomes conducting to energize device 1 which may be arranged in any suitable manner, as is well known to the art, to control the circuit 28. The releasing condition is then $E_I = E_E$. Since, however, $E_I = aIt$ while $E_E$ is proportional to the fault voltage, $$E_E = bE = aIt \text{ or } t = \frac{b}{a}\frac{E}{I}$$

In other words, the operating time is directly proportional to the impedance.

Instead of influencing the current rise by electrical inertia with the resistance 29, there may be employed a regulating resistance controlled by an independent auxiliary power or a regulating transformer responsive to the current of the circuit to be controlled. An arrangement of this kind is illustrated in Fig. 8. In this arrangement the rectification of the current to be controlled is unnecessary and the rectifier 8 and the condenser 10 are omitted. In their place there is substituted a voltage divider, such as a resistance 31 in parallel with the secondary windings of the current energized transformer 6. The sliding contact or tap 32 of the resistance 31 is controlled by a motor device 33 which may be energized from a suitable source illustrated in this case as the anode source 12. The voltage across that portion of the resistance between the sliding contact 32 and the terminal 34 is connected in the grid circuit, together with the voltage across the condenser 11. The motor 33 may be arranged to come into operation on the occurrence of the fault by suitable means indicated as an overcurrent relay 30 or any suitable fault responsive device. If the speed of the motor 33 is uniform, then the time necessary to render the valve 2 conductive whereby to effect the operation of the device 1 is proportional to the impedance, just as is the case with the arrangement shown in Fig. 7. The advantage of using the voltage dividing resistance 31 is that the operating characteristic of the arrangement can be influenced in any desired way by corresponding graduation or control of the resistance 31.

Fig. 9 illustrates another impedance responsive apparatus in which the time variation of one of the characteristic magnitudes to be compared is effected by resonance and in connection with which only one rectifier is required. In circuit with the secondary of the transformer 6, which is connected to be energized in accordance with the current in the circuit 28, there is included a resonance circuit comprising an inductance 35, a condenser 36 and a resistance 37. This circuit is tuned to the frequency of the current in the line or circuit 28. The operation of this arrangement will be described with reference to Fig. 10. The voltage across the condenser 11 varies uniformly from the instant of the fault ($t = 0$) and is proportional to the fault voltage. The voltage across the resistance 37 is a sine curve of increasing amplitude. The initial slope of the envelope of the curve of the voltage across the resistance and the final value of the voltage are proportional to the fault current. The discharge of the valve 2 and thereby the energization of the device 1 takes place when the resulting voltage on the grid of the valve 2 is zero after the expiration of a time $t'$ which, for the reasons heretofore explained, is proportional to the ratio between the fault voltage and fault current, that is to the impedance.

Instead of having the time variation accomplished in the current circuit, it may be effected in the voltage circuit as illustrated in the embodiment of my invention shown in Fig. 11. In this case there are connected in parallel with the condenser 11, resistances 38 and 39 which are arranged to be connected alternatively to the condenser 11. This change in connection may be effected by any suitable fault responsive means illustrated for the sake of example, as an overcurrent relay 30, which responds to abnormal conditions in the circuit 28. Thus, in the event of a fault, the condenser 11 momentarily assumes a charge corresponding to the fault voltage $E_E$. The operation of the relay 30 then changes the connection of the condenser 11 from its charging position across the resistance 38 to its discharging position across the resistance 39. The current limiting resistance 40 may be placed in series with the condenser 11, if desired. The current $i$ through the resistance 39 then falls in accordance with the equation $$i = \frac{E_E}{R} e^{-\frac{t}{T}}$$

The voltage on the grid of the valve 2 becomes zero when the voltage drop across the resistance 39 becomes equal and opposite to the voltage drop $E_I$ across the condenser 10, thus $$E_I = E_E e^{-\frac{t}{T}}$$

From this follows $$e^{-\frac{t}{T}} = \frac{E_E}{E_I} \text{ or } t = T \ln \frac{E_E}{E_I}$$

The operating characteristic of this arrangement is as illustrated in Fig. 12, which offers advantages in connection with many kinds of power conductors.

Fig. 13 illustrates an embodiment of my invention in fault responsive apparatus which operates in accordance with the reactance of an alternating current circuit. In this arrangement the current transformer 6 is provided with two secondary windings 60, 61, which charge the condensers 10', 10'', respectively, through the rectifiers 8', 8'', respectively. The potential transformer 7 supplies a resonance circuit including the condenser 36, inductance 35 and resistance 37. The vector sum of the alternating voltage across the secondary winding 60 of the transformer 6 and across the inductance 35 is supplied to the rectifier 9 to furnish the condenser 11 with a direct voltage proportional to this vector sum. The condensers 10', 10'', and 11 are, therefore, all in the grid circuit of the valve 2.

The operation of this arrangement will be described in connection with the vector diagram shown in Fig. 14. In this diagram, I and E indicate the secondary voltages of the transformers 6 and 7, these voltages being proportional to the current and the voltage of the circuit 28, respectively. The phase angle between these voltages corresponds to the phase angle between the fault current and the fault voltage. The voltage dependent on the current I as derived from the secondary 60 is connected in series with the voltage E across the inductance 35, which is disposed substantially 90° with respect to the voltage E. The condenser 11 is accordingly charged through the rectifier 9 to a direct voltage proportional to the vector sum R. This direct voltage is supplied to the grid of the valve 2 in opposition to the voltage across the condenser 10', which is proportional to the current I in the circuit 28 so that as the resultant of these two condenser voltages the difference BC is effective. This difference, as can be seen from Fig. 14, is approximately equal to $$E \cos(90° - \phi) = E \sin \phi$$

Inasmuch as in actual practice $\phi$ will remain comparatively small, this approximation is permissible. By reason of the resistance 29 in circuit with the rectifier 8'', the voltage on the condenser 10'' increases proportionately to the time. When this voltage and the differential voltage of the condensers 11 and 10' become equal, the valve 2 becomes conductive whereby to energize the winding of the protective device 1.

In Fig. 15 the course of the grid voltages is represented with respect to time. The point at which the discharge starts is indicated by the vertical line through the origin 0. Positive voltages are plotted upwardly and negative downwardly. $E_I''$ is the positive voltage across the condenser 10'' increasing with the time. $E_I'$ is the positive voltage across the condenser 10' and R the resultant voltage across the condenser 11. The resultant of these three voltages, which is drawn in dotted line in Fig. 15, becomes effective on the grid 5 of the valve 2. This resultant decreases as the voltage R decreases while the voltage $E_I''$ increases. When the resultant becomes zero, the valve 2 becomes conductive. It will be apparent from the analysis in connection with the description of Fig. 7 that the operating time of the arrangement shown in Fig. 13 is proportional to the quantity $$\frac{E \sin \phi}{I}$$

that is to the reactance.

If the connection in Fig. 13 is so modified that the secondary voltage of the potential transformer 7 is, itself, connected directly in series with the voltage across the secondary 60 of the current transformer 6, then there will be obtained an arrangement whose operating time is dependent on $$\frac{E \cos \phi}{I}$$

that is on the resistance. Protective apparatus of this kind is preferably employed in cable systems which have a small inductive reactance while reactance dependent apparatus is preferably employed in conductors which have high inductance as for example overhead lines.

In those embodiments of my invention in which the relative values of two coexisting alternating current magnitudes of an electric system are used to obtain the desired operation, the characteristic curves of the electric discharge valve 2 may be corrected through a grid biasing voltage in such a way that the valve is rendered conductive when the difference between the condenser voltages effective in the grid circuit becomes zero. In Fig. 16 the curve $f$ indicates the characteristic of a discharge valve which becomes conductive only at a positive grid voltage. In Fig. 17 there is shown a connection arrangement particularly suited to a valve having this characteristic. This is distinguished from the preceding arrangements in that the condenser 10 is connected not directly to the cathode 4 but to a suitably selected point of the resistance 13 which is connected between the positive pole of the anode source 12 and the positive end of the cathode. A characteristic in accordance with the curve $h$ of Fig. 16 is corrected by a connection arrangement such as is shown in Fig. 18. In this case the condenser 10 is connected to a suitably selected point of a resistance 41 in the anode circuit between the negative pole of the anode source 12 and the negative end of the cathode.

In Figs. 17 and 18 the anode circuit of the valve 2 is not directly connected to the positive pole of the direct current source 12 of anode current but to a point in the resistance 13 intermediate the positive pole of the anode source and the positive end of the cathode. By means of this arrangement, voltage fluctuations of the anode source 12 are equalized in their effect on the valve 2 since the anode voltage and the grid biasing voltage vary correspondingly. The stability of the valve characteristic is of particular importance for distance protective relaying since several relays are always disposed along the conductor to be protected and the properties of these relays must, as far as possible, be invariable in order to insure the correct sequence of operation in case of a fault. The requirements as to the fixity of the operating characteristic are particularly exacting because it frequently happens that the resistance of the arc accompanying the fault is great in comparison with the resistance of the length of the conductor between two relay locations. The operating times of two consecutive relays do not then differ very much from each other. Consequently, if the operating characteristic of one relay has been incorrectly changed, it may happen that the relay nearer the fault does not operate but that one farther away may operate and the selective protection is lost.

The operating characteristic of the arrangements described is a straight line at least as long as the operation is in the linear part of the voltage curve of the condenser. In many cases, however, certain deviations from this straight line are desired as already mentioned with reference to Figs. 8 and 11. These requirements can be advantageously accomplished by providing the transformers 6 and 7, as shown in Figs. 19 and 20, with a contraction 42 in the magnetic circuit or core 50 to provide series saturation or with a magnetic shunt 43 to the secondary winding. Figs. 19 to 22 not only show this construction of the transformers but also the forms of the operating characteristic obtainable therewith, Fig. 21 being the operating characteristic obtainable with the transformers, as in Fig. 19, and Fig. 22 being the operating characteristic obtainable with the transformers, as in Fig. 20. Similar effects can also be obtained by voltage dependent resistances as for example the resistance 29.

The fault responsive starting relays 30 can also be used in addition for protecting the time relay arrangements under normal conditions against disturbance by sneak currents and the like. Fig. 23 shows an arrangement of this kind. Under normal conditons, the condensers 10 and 11 are short-circuited by the closed contacts 44 and 45 of the starting relay 30. The normally closed contacts 46 of the starting relay may also supply a negative locking voltage to the grid 5 of the valve 2. The starting relay 30 may further be provided with contacts 47 which, under normal conditions, open the anode circuit of the valve 2.

If no direct voltage is available in the relay station, a polarized relay 48 and an additional rectifier 49 may be used to obtain an impedance time relay as is shown in Fig. 24. The voltages across the condensers 10 and 11 take effect as described with reference to the arrangement shown in Fig. 7. If the voltage across the condenser 11 is greater than that across the condenser 10, the rectifier 49 prevents flow of current through the operating winding of the polarized relay 48. If, on the other hand, the voltage across the condenser 10 is greater than the voltage across the condenser 11, the relay 48 will be energized to close the circuit of the operating winding of the device 1. Particularly sensitive relays, such for example as polarized relays operating on the rotating winding principle, are advantageously employed in this case in order not to overload the current transformer 6 and also in order not to have to employ large condensers 10 and 11.

In order to render electro-responsive time delay protective apparatus of the type embodying my invention and particularly the rectifiers, where the dry type is used, insensitive even to considerable temperature variations, temperature dependent compensating resistances, examples of which are well known to the art, may be employed so that the protective arrangements are suitable for open air stations without attendants. It will be apparent to those skilled in the art that voltage dependent resistances can be advantageously employed in the cathode circuit of the valve in order to eliminate the influence of voltage variations of the anode source.

While I have shown and described my invention in considerable detail, I do not desire to be limited to the exact arrangements shown but seek to cover in the appended claims all those modifications that fall within the true spirit and scope of my invention.

What I claim as new and desire to secure by Letters Patent of the United States, is:

1. In combination with an electric system, fault responsive protective means therefor including two electric discharge valves and means connected to be energized in accordance with the difference between two alternating current magnitudes derived from the system for selectively rendering one or the other of said valves conductive in dependence on the alternating current magnitude having the greater value.

2. In combination with an alternating current electric system, fault responsive protective means therefor including two electric discharge valves and means for selectively rendering one or the other of said valves conductive in accordance with the relative values of two alternating current magnitudes derived from the system including rectifying means connected to be energized respectively in accordance with said alternating current magnitudes.

3. In combination with an alternating current electric system, fault responsive protective means therefor selectively operable in accordance with the relative values of two alternating current magnitudes derived from the system, means for providing two rectified voltages respectively dependent on said alternating current magnitudes and two electric discharge valves each having control electrode means connected to be energized in accordance with the difference between said rectified voltages, the control electrode means of one valve being reversely connected with respect to the control electrode means of the other valve.

4. In combination with an alternating current electric system, fault responsive protective means therefor including two electric discharge valves and means for selectively rendering one or the other of said valves conductive in dependence on the greater of two alternating current magnitudes derived from the system including halfwave rectifying means connected to be energized respectively in accordance with said magnitudes.

5. In combination with an electric system comprising two parallel lines, fault responsive protective means for controlling said lines including two devices to be operated and means for selectively controlling the operation of said devices in accordance with the line carrying the greater current including two electric discharge valves each having control electrode means connected to be energized in accordance with the difference between the line currents, the control electrode means of one valve being reversely connected with respect to the control electrode means of the other valve.

6. In combination with an alternating current electric system comprising two parallel lines, fault responsive protective means for controlling said lines including two devices to be operated and means for selectively controlling the operation of said devices in accordance with the line carrying the greater current including two electric discharge valves and means for selectively rendering one or the other of said valves conductive in accordance with the line carrying the greater current including half-wave rectifying means connected to be energized respectively in accordance with the currents of said lines.

7. In combination with an electric system, fault responsive protective means therefor selectively operable in accordance with the relative values of the current at each of two points of the system including two normally nonconductive electric discharge valves, and means for selectively rendering one or the other of said valves conductive in dependence on the current having the greater value including control electrode means for each valve, the control electrode means of said valves being connected for energization in accordance with the difference between the currents at said points and the control electrode means of one valve being reversely connected with respect to the control electrode means of the other valve.

ROLF WIDERÖE.